US009207656B2

(12) United States Patent
Ballabio et al.

(10) Patent No.: US 9,207,656 B2
(45) Date of Patent: Dec. 8, 2015

(54) METHOD FOR CONTROLLING THE DEPOSITION OF SEMIFINISHED ELEMENTS FOR TYRE PRODUCTION

(75) Inventors: Michele Ballabio, Milan (IT); Gaetano Lo Presti, Milan (IT); Giuliana Mattiazzo, Turin (IT); Vincenzo Orlando, Turin (IT); Simone Corbellini, Turin (IT)

(73) Assignee: PIRELLI TYRE S.P.A., Milano (IT)

( * ) Notice: Subject to any disclaimer, the term of this patent is extended or adjusted under 35 U.S.C. 154(b) by 341 days.

(21) Appl. No.: 13/807,611

(22) PCT Filed: Jun. 13, 2011

(86) PCT No.: PCT/IB2011/052554
§ 371 (c)(1),
(2), (4) Date: Dec. 28, 2012

(87) PCT Pub. No.: WO2012/001562
PCT Pub. Date: Jan. 5, 2012

(65) Prior Publication Data
US 2013/0103181 A1 Apr. 25, 2013

Related U.S. Application Data

(60) Provisional application No. 61/362,179, filed on Jul. 7, 2010.

(30) Foreign Application Priority Data

Jun. 30, 2010 (IT) .............................. MI2010A1191

(51) Int. Cl.
*G05B 15/00* (2006.01)
*B29D 30/30* (2006.01)
(Continued)

(52) U.S. Cl.
CPC .............. *G05B 15/00* (2013.01); *B29D 30/305* (2013.01); *G01B 11/06* (2013.01); *G01B 21/08* (2013.01); *B29D 2030/427* (2013.01); *B29D 2030/428* (2013.01); *B29D 2030/4406* (2013.01)

(58) Field of Classification Search
CPC ........ G05B 15/00; G01B 21/08; G01B 11/06; B29D 30/305; B29D 2030/4406; B29D 2030/427; B29D 2030/428
USPC .......................................... 700/117; 156/117
See application file for complete search history.

(56) References Cited

U.S. PATENT DOCUMENTS

| 4,842,413 | A |   | 6/1989 | Kuijpers et al. |
| 5,245,867 | A | * | 9/1993 | Sube et al. ..................... 73/146 |

(Continued)

FOREIGN PATENT DOCUMENTS

| DE | 39 26 721 A1 | 2/1991 |
| DE | 100 36 010 A1 | 2/2002 |

(Continued)

OTHER PUBLICATIONS

International Search Report from the European Patent Office for International Application No. PCT/IB2011/052554, mailing date Nov. 17, 2011.

(Continued)

*Primary Examiner* — Kenneth M Lo
*Assistant Examiner* — Alan Chu
(74) *Attorney, Agent, or Firm* — Finnegan, Henderson, Farabow, Garrett & Dunner, L.L.P.

(57) ABSTRACT

A method of controlling the deposition of semifinished elements for tire production, includes: sending a first radiation onto one tire being processed, consisting of one forming support with at least one portion of the tire component laid on the support, the tire component being at least partly formed of a plurality of semifinished elements defining a radially external layer of the tire being processed; receiving a first reflected radiation from a radially external surface of the tire being processed; determining, as a function of the reflected radiation, parameters representative of the thickness of the layer; comparing the parameters with reference values; and generating an alarm signal as a function of the comparison.

28 Claims, 4 Drawing Sheets

(51) Int. Cl.
*G01B 11/06* (2006.01)
*G01B 21/08* (2006.01)
*B29D 30/42* (2006.01)
*B29D 30/44* (2006.01)

(56) References Cited

U.S. PATENT DOCUMENTS

| | | | |
|---|---|---|---|
| 5,845,232 A * | 12/1998 | Shively et al. | 702/105 |
| 2003/0051794 A1 * | 3/2003 | Suda et al. | 156/123 |
| 2004/0238986 A1 | 12/2004 | Kobayashi | |
| 2005/0052657 A1 * | 3/2005 | Braghiroli | 356/602 |
| 2005/0120787 A1 * | 6/2005 | Thiesen et al. | 73/146.5 |
| 2007/0084541 A1 * | 4/2007 | Moriguchi et al. | 156/117 |
| 2007/0113948 A1 | 5/2007 | Shimizu et al. | |
| 2010/0024949 A1 | 2/2010 | Mancini et al. | |
| 2010/0043940 A1 * | 2/2010 | Ogawa | 156/64 |
| 2010/0126647 A1 * | 5/2010 | Hashimura et al. | 152/510 |
| 2011/0202309 A1 | 8/2011 | Kostka et al. | |

FOREIGN PATENT DOCUMENTS

| | | |
|---|---|---|
| EP | 0 289 101 A1 | 11/1988 |
| EP | 1 028 304 A1 | 8/2000 |
| JP | 58-173409 | 10/1983 |
| JP | 61-14507 | 1/1986 |
| JP | 2004-9339 | 1/2004 |
| JP | 2004-354258 | 12/2004 |
| WO | WO 01/39963 A1 | 6/2001 |
| WO | WO 2005/065924 A1 | 7/2005 |
| WO | WO 2006/059351 A1 | 6/2006 |
| WO | WO 2008/062609 | 5/2008 |
| WO | WO 2008/077418 A1 | 7/2008 |
| WO | WO 2009/040594 A1 | 4/2009 |
| WO | WO 2010/020398 A1 | 2/2010 |

OTHER PUBLICATIONS

Written Opinion of the International Searching Authority Office from the European Patent Office for International Application PCT/IB2011/052554, mailing date Nov. 17, 2011.

Notice of Reasons for Rejection from the Japanese Patent Office, in counterpart Japanese Application No. 2013-517605 dated Jun. 18, 2015.

Notification of the First Office Action issued Aug. 1, 2014 by the State Intellectual Property Office of the People's Republic of China (12 pages).

English-language translation of Notification of the First Office Action issued Aug. 1, 2014 by the State Intellectual Property Office of the People's Republic of China (9 pages).

Qiming, H., *Applied Television Technology*, Yunnan Science & Technology Press Co., Ltd., Oct. 31, 1997, p. 188 (4 pages).

Qiming, H., *Applied Television Technology*, Yunnan Science & Technology Press Co., Ltd., Oct. 31, 1997, pp. 188-191 (4 pages).

* cited by examiner

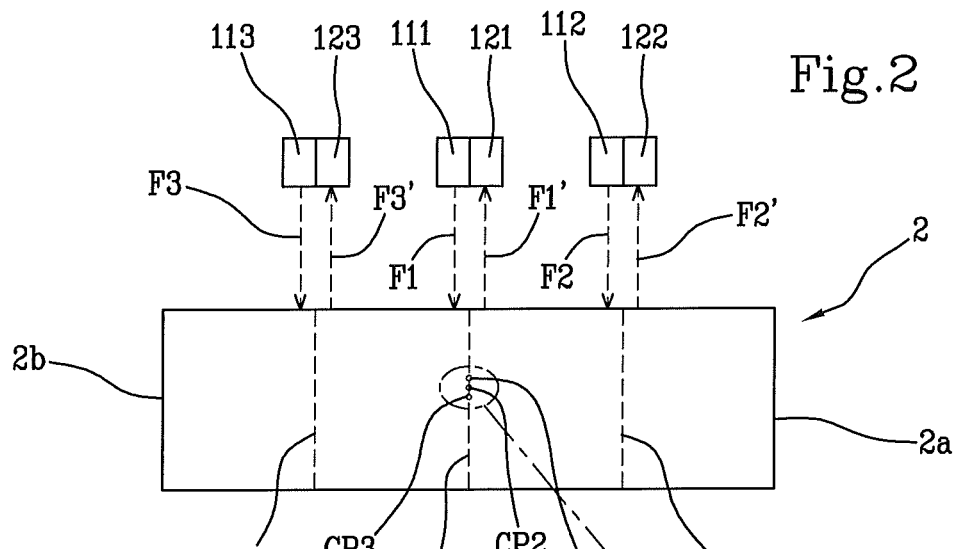
Fig.2
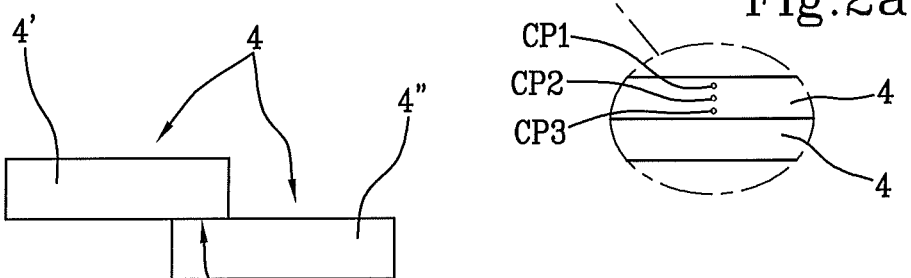
Fig.2a
Fig.3a
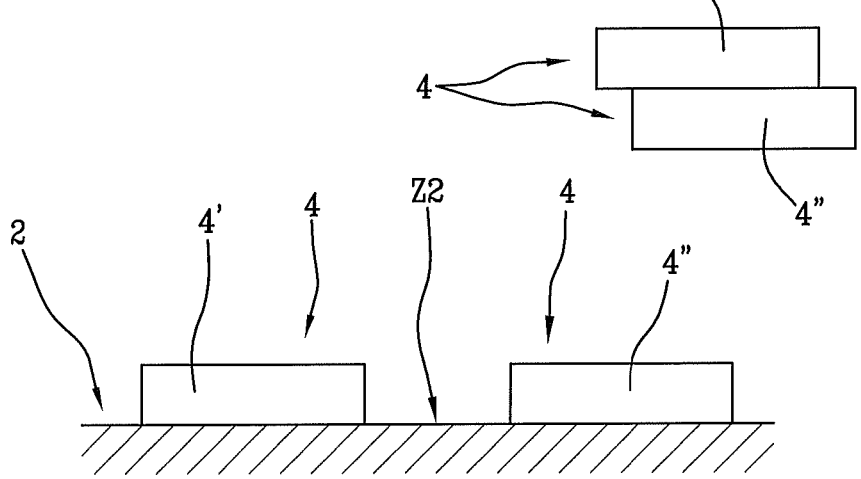
Fig.3b
Fig.3c

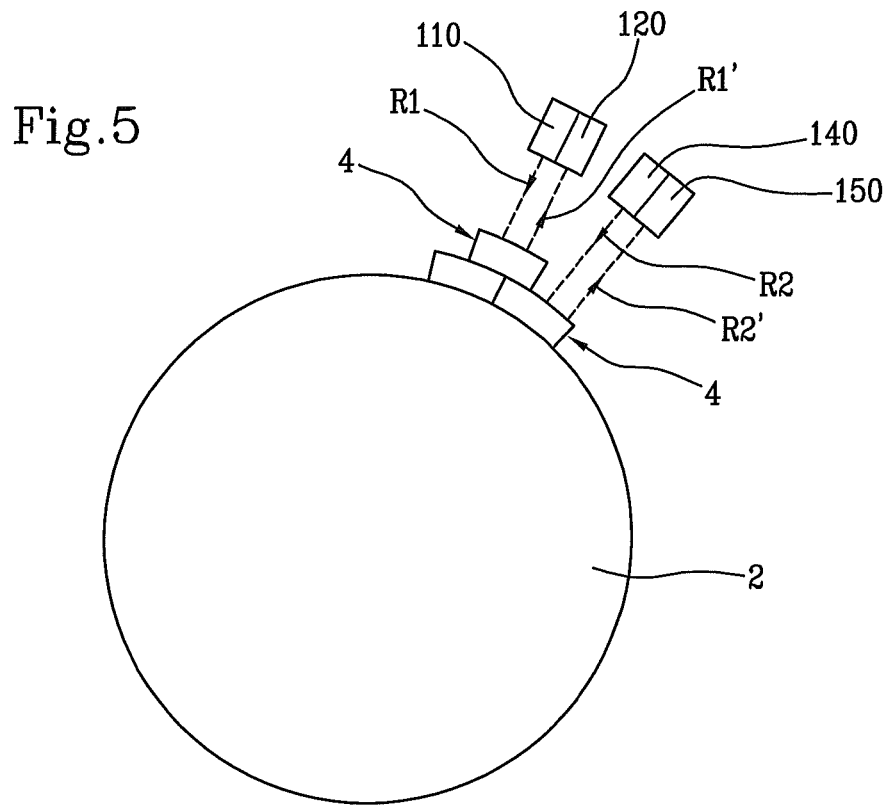
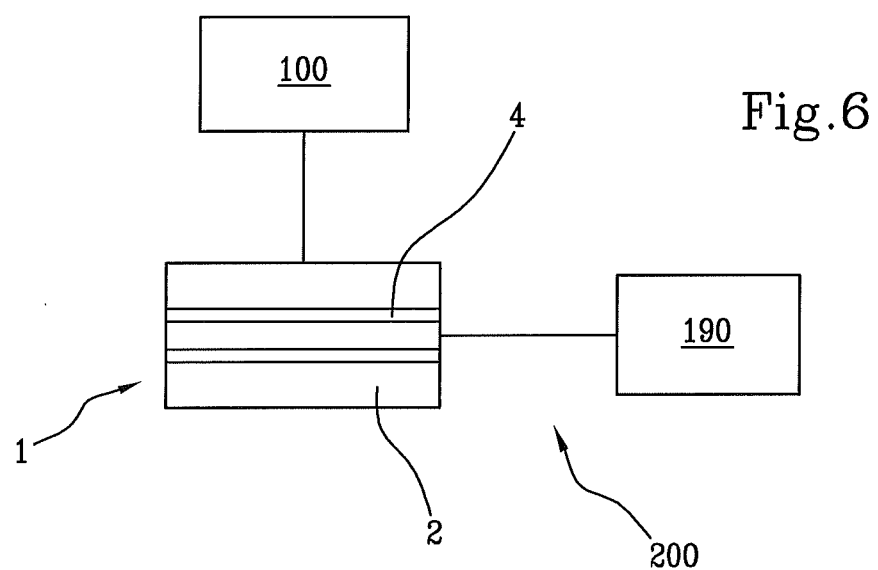

METHOD FOR CONTROLLING THE DEPOSITION OF SEMIFINISHED ELEMENTS FOR TYRE PRODUCTION

CROSS REFERENCE TO RELATED APPLICATIONS

This application is a national phase application based on PCT/IB2011/052554, filed Jun. 13, 2011, which claims the priority MI2010A001191, filed Jun. 30, 2010, and the benefit of U.S. Provisional Application No. 61/362,179, filed Jul. 7, 2010, the content of all of which is incorporated herein by reference.

BACKGROUND OF THE INVENTION

1. Field of the Invention

The present invention relates to a method of controlling the deposition of semifinished elements for tyre production. Said invention also relates to an apparatus for controlling the deposition of semifinished elements for tyre production, and a work station for laying semifinished elements for tyre production.

2. Description of the Related Art

According to some techniques that are presently used, tyres for vehicles can be made by deposition of semifinished elements around a building support, such as a forming drum, for example.

Depending on the type of process used, the forming drum can have a substantially toroidal or a substantially cylindrical conformation.

The semifinished elements can consist of the so-called "strip-like elements", i.e. elongated sections of elastomeric material cut to size and embedding at least two textile or metallic reinforcing cords disposed parallel to each other in the longitudinal direction of said sections. These strip-like elements suitably disposed in side by side or partially overlapped relationship, cooperate in forming the different tyre components. In particular, the strip-like elements can be used for manufacturing carcass plies, belt strips, or other reinforcing components present in tyres.

Depending on the type of process employed, the different tyre components can be manufactured either on the same forming support or on different supports and subsequently associated with each other.

In the present context and in the following claims, by "tyre being processed" it is intended a forming support of the tyre with at least one portion of a tyre component laid on the support itself.

Within the scope of the present description and in the following claims, by the term "component" of the tyre it is intended any component adapted to perform a function (in the tyre) or a portion thereof, selected for example from: liner, underliner, carcass ply/plies, underbelt insert, belt strips both crossed with each other and at zero degrees, attachment skim coat for the tread band, tread band, bead core, bead filler, textile or metal reinforcing inserts or reinforcing inserts made of elastomeric material alone, abrasion-proof insert, sidewall insert.

SUMMARY OF THE INVENTION

The Applicant has noticed that, with reference to deposition of said semifinished elements, in particular when strip-like elements are concerned, situations can occur in which these semifinished elements are not correctly positioned.

Typically, it may happen that:

two strip-like elements, that should be only partly overlapped (the so-called condition of correct "overlap"), are almost completely overlapped; or an empty space is present between two consecutive strip-like elements, in which space nothing has been laid, generally due to lack of deposition of a strip-like element at a given location.

Both the highlighted circumstances can seriously impair the tyre quality. In fact, an excessive overlap between two strip-like elements can make the tyre have too much thickness at such an overlap—also due to the radial conformation or expansion to which the tyre being processed can be submitted.

On the other hand, the absence of a strip-like element can cause a clear structural lack in the tyre, making the same substantially useless.

The solutions known in the art are not able to provide useful information for ensuring correct positioning of the strip-like elements around the forming support employed.

In particular, no indication or suggestion is obtained as to the possibility of identifying conditions of excessive overlap between a pair of strip-like elements or conditions in which two strip-like elements are spaced apart from each other too much.

The Applicant has perceived that important information on the correct deposition of the strip-like elements can be found taking into account the thickness (or in any case a parameter connected with the thickness) of the radially external layer of the tyre being processed, along the circumferential extension of same.

In fact, following correct deposition of the strip-like elements around the forming support, thickness of the radially external layer shall have, within limits, a predetermined conformation.

The Applicant has therefore found that control of the deposition of the semifinished elements employed can be carried out through sending of radiation to the radially external layer of the tyre being processed, detection of a corresponding reflected radiation and processing of the latter in such a manner as to determine one or more parameters representative of the thickness of the same radially external layer. By comparing such one or more parameters with respective thresholds, it is therefore possible to determine whether the thickness of the radially external layer is in compliance with the provided profile and, on the contrary, to generate an alarm signal.

In accordance with a first aspect, the invention relates to a method of controlling the deposition of semifinished elements for tyre production, said method comprising:

sending a first radiation onto at least one component of a tyre being processed, said component being at least partly formed with a plurality of semifinished elements defining a radially external layer of said tyre being processed;

receiving a corresponding first reflected radiation from a radially external surface of said tyre being processed;

determining, as a function of said first reflected radiation, one or more parameters representative of a thickness of said radially external layer;

comparing said one or more parameters with corresponding threshold values;

generating an alarm signal as a function of said comparison.

It is the Applicant's opinion that due to the combination of the above identified technical features, checking of the presence of possible errors in the arrangement of the semifinished elements laid down can be done in an accurate and reliable manner. In particular, it is possible to identify conditions of excessive overlap between a pair of contiguous semifinished elements, or conditions in which two contiguous semifinished elements are spaced apart from each other too much. This by virtue of the fact that processing of the received radiations allows determination of the outer conformation of the tyre being processed and therefore of the true correct arrangement of the semifinished elements laid down.

In this manner it is possible to identify tyres having structural lacks (exactly due to the wrong positioning of the laid semifinished elements), and therefore prevent the same from being further processed for completing building of the tyre and subsequently putting it on the market.

In accordance with a second aspect, the invention relates to an apparatus for controlling the deposition of semifinished elements for tyre production, said apparatus comprising:

a first emitting structure for sending a first radiation onto at least one component of a tyre being processed, said component being at least partly formed with a plurality of semifinished elements defining a radially external layer of said tyre being processed;

a first receiving structure for receiving a corresponding first reflected radiation from a radially external surface of said tyre being processed;

a processing unit provided with:

an operating module configured for determining, as a function of at least said first reflected radiation, parameters representative of a thickness of said radially external layer;

a comparison module configured for comparing said one or more parameters with corresponding threshold values;

a transmission module configured for generating an alarm signal as a function of said comparison.

The present invention in at least one of the above aspects can have at least one of the following preferred features.

Preferably, said first reflected radiation is representative of a distance between the radially external surface of the tyre being processed and a receiving point of said reflected radiation.

Preferably, said one or more parameters comprise a first parameter representative of mutual overlapping of said semifinished elements.

Preferably, said one or more parameters are determined as follows:

determining a plurality of values representative of the thickness of said radially external layer;

comparing said values with a first threshold value;

determining how many of said values are higher than said first threshold value.

Preferably, the number of consecutive values higher than said first threshold value defines said first parameter.

More preferably, said alarm signal is generated if said first parameter is greater than a first reference value. In this way, it is possible to evaluate whether the overlap is excessive, i.e. it is possible to determine whether the two semifinished elements overlap each other to a correct or an excessive amount.

In particular, it is advantageously taken as the reference, the thickness variation of the outer layer along the circumferential extension of the tyre being processed, i.e. the layer formed with the laid semifinished elements, for evaluating the overlapping amount between them.

Preferably, the first reference value for said first parameter is representative of a length equal to at least ⅓ of the length of a semifinished element measured along the circumferential extension of said forming support.

In particular, the first reference value for said first parameter is representative of a length equal to at least ½ of the length of a semifinished element measured along the circumferential extension of said forming support.

Preferably, said one or more parameters comprise a second parameter representative of a lack of mutual overlapping between said semifinished elements.

Preferably, determining said one or more parameters comprises:

determining a plurality of values representative of the thickness of said radially external layer;

comparing said values with a second threshold value;

determining how many of said values are lower than said second threshold value.

Preferably, the number of consecutive values smaller than said second threshold value defines said second parameter.

More preferably, said alarm signal is generated if said second parameter is greater than a second reference value. In this way the amount of the lack of overlap is evaluated, i.e. it is determined whether the distance between two semifinished elements is correct or excessive.

In particular, it is advantageously taken as the reference, the thickness variation of the outer layer along the circumferential extension of the tyre being processed, i.e. the layer formed with the laid semifinished elements, for evaluating the lack of overlap between two semifinished elements.

Preferably, the second reference value for said second parameter is representative of a length equal to at least ⅓ of the length of a semifinished element measured along the circumferential extension of said forming support.

In particular, the second reference value for said second parameter is representative of a length equal to at least ½ of the length of a semifinished element measured along the circumferential extension of said forming support.

Preferably, determining said plurality of values representative of the thickness of said radially external layer comprises determining the thickness of the radially external layer in a plurality of circumferential positions of said tyre being processed.

Preferably, at least part of said circumferential positions belongs to an axial mid-line plane of said forming support.

Preferably, said first radiation comprises at least one radiation beam directed, in time succession, onto said circumferential positions of said tyre being processed.

Preferably, part of said circumferential positions belongs to a pair of auxiliary planes substantially parallel to said axial mid-line plane, each of said auxiliary planes being interposed between said axial mid-line plane and a respective axial end of said forming support.

Preferably, said auxiliary planes are at substantially symmetric positions relative to said axial mid-line plane.

Preferably, the first radiation further comprises a pair of auxiliary radiation beams directed, in time succession, onto the positions belonging to said auxiliary planes.

Preferably, filtering of said first reflected radiation is also carried out, in such a manner as to eliminate at least the six first harmonic components of said first reflected radiation. In particular, the nine first harmonic components of said first reflected radiation are eliminated.

Preferably, also carried out is detection of an outer conformation of said forming support, said one or more parameters representative of the thickness of said radially external layer being also determined as a function of the conformation of said forming support.

Preferably, detection of said outer conformation is performed before deposition of said semifinished elements.

By so doing, the outer conformation of the support is directly acquired, and this information can be usefully employed for determining the parameters representative of the radial thickness of the outer layer of the tyre being processed.

According to a preferred embodiment, for each circumferential position onto which said first radiation is sent, it is provided:

sending a second radiation onto said tyre being processed, at a circumferentially spaced apart position relative to the position onto which said first radiation is sent;

receiving a corresponding second reflected radiation from the radially external surface of said tyre being processed, said one or more parameters being also determined as a function of said second reflected radiation.

Preferably, the operations of sending said radiation/s and receiving said reflected radiation/s are performed during deposition of said semifinished elements.

Preferably, said semifinished elements are strip-like elements.

Preferably, said component of the tyre being processed comprises one or more carcass plies of said tyre.

Preferably, said component of the tyre being processed comprises one or more belt strips.

Preferably, said operating module is configured for:
determining a plurality of values representative of a thickness of said radially external layer;
comparing said values with a first threshold value;
determining how many of said values are higher than said first threshold value.

Preferably, the number of consecutive values higher than said first threshold value defines said first parameter.

More preferably, said comparison module is configured for comparing said first parameter with a first reference value.

Most preferably, said transmission module is configured for generating said alarm signal if said first parameter is greater than said first reference value.

Preferably, said operating module is configured for:
determining a plurality of values representative of a thickness of said radially external layer;
comparing said values with a second threshold value;
determining how many of said values are smaller than said second threshold value.

Preferably, the number of consecutive values smaller than said second threshold value defines said second parameter.

More preferably, said comparison module is configured for comparing said second parameter with a second reference value.

Most preferably, said transmission module is configured for generating said alarm signal if said second parameter is greater than said second reference value.

Preferably, said operating module is configured for determining said plurality of values representative of a thickness of said radially external layer by determining the thickness of the radially external layer at a plurality of circumferential positions of said tyre being processed.

Preferably, at least part of said circumferential positions belongs to an axial mid-line plane of said forming support.

Preferably, said first emitting structure comprises at least one main emitter positioned in said axial mid-line plane, and said first receiving structure comprises at least one main sensor positioned in said axial mid-line plane.

Preferably, said first emitting structure comprises a pair of auxiliary emitters, each positioned in a respective auxiliary plane.

Preferably, said first receiving structure comprises a pair of auxiliary sensors, each positioned in a respective one of said auxiliary planes.

Preferably, said processing unit further comprises a filtering module for filtering said first reflected radiation in such a manner as to eliminate at least the six first harmonic components of said first reflected radiation.

In particular, said filtering module eliminates at least the nine first harmonic components of said first reflected radiation.

Preferably, said operating module is configured for determining said one or more parameters representative of the thickness of said radially external layer also as a function of the conformation of said forming support.

In particular, said operating module is configured, in co-operation with said first emitting structure and said first receiving structure, for detecting said outer conformation of the forming support.

In an embodiment, said operating module is configured for determining said one or more parameters also as a function of a second reflected radiation from the radially external surface of said tyre being processed, obtained from a second radiation sent onto said tyre being processed, at a circumferentially spaced apart position relative to the position onto which said first radiation is sent, for each circumferential position onto which said first radiation is sent.

According to a preferred embodiment, provision is also made for:
a second emitting structure for sending at least said second radiation onto said tyre being processed;
a second receiving structure for receiving at least said second reflected radiation from the radially external surface of said tyre being processed.

Further features and advantages will become more apparent from the detailed description of a preferred embodiment of the invention given by way of non-limiting example.

BRIEF DESCRIPTION OF THE DRAWINGS

This description is taken hereinafter with reference to the accompanying drawings, also given by way of non-limiting example, in which:

FIG. 2 is a diagrammatic side view of the tyre being processed seen in FIG. 1;

FIG. 2a is an enlarged view of a detail seen in FIG. 2;

FIGS. 3a-3c diagrammatically show different conditions of mutual positioning of semifinished elements used in the tyre being processed of FIG. 1;

FIG. 5 diagrammatically shows a view in axial direction of some elements related to a preferred embodiment of the invention;

FIG. 6 is a block diagram of a work station comprising an apparatus according to an aspect of the present invention.

DETAILED DESCRIPTION OF THE INVENTION

Figure 1:
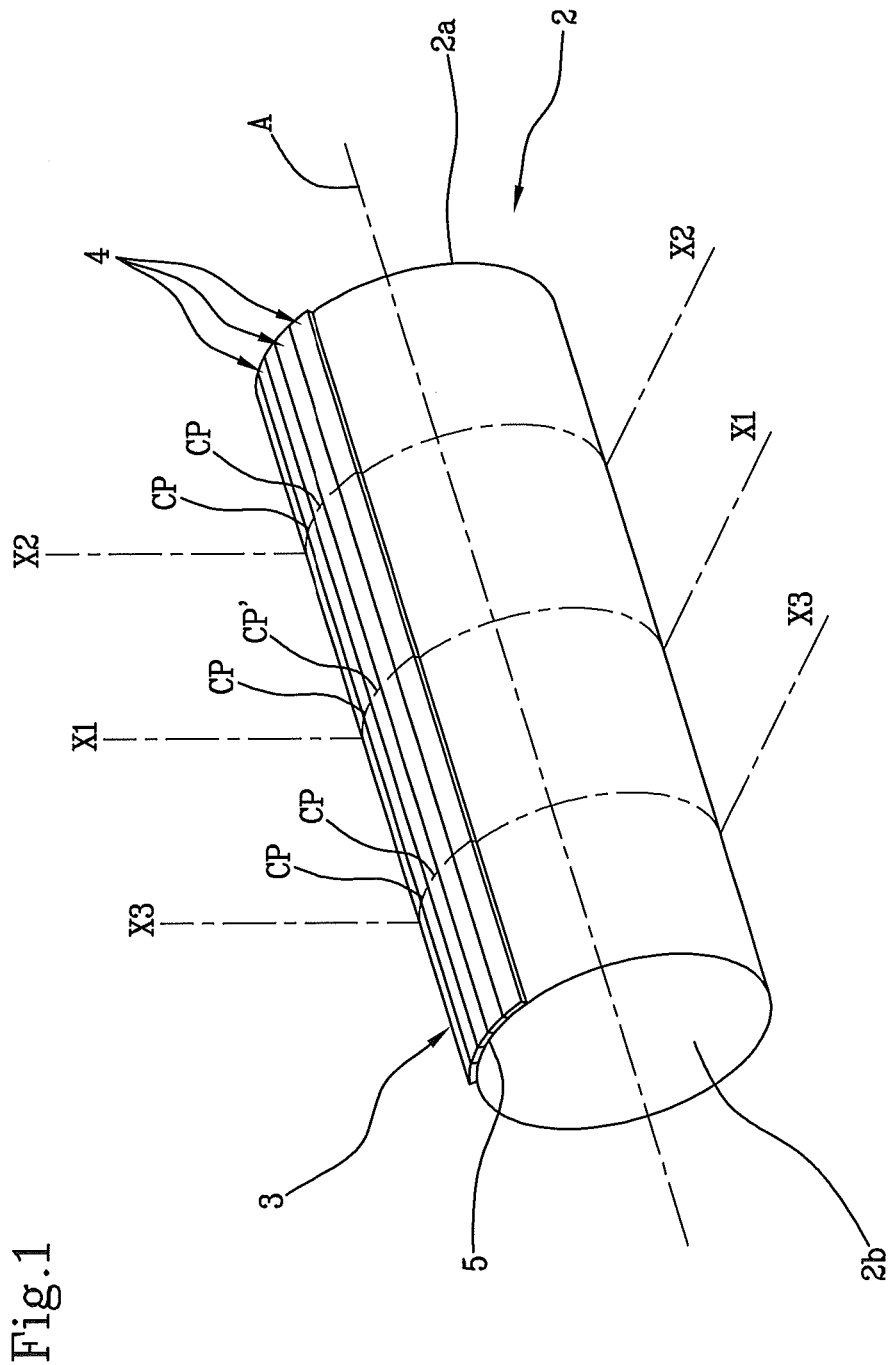
FIG. 1 diagrammatically shows a perspective view of a tyre being processed. to which the method of the invention is applied.

With reference to the drawings, a tyre being processed has been generally identified by reference numeral 1.

In the accompanying drawings, reference numerals 2 and identify a forming support and a component of the tyre being processed, respectively.

The forming support 2 preferably is a forming drum.

The forming support 2 may have a substantially cylindrical or toroidal shape, depending on the technology used for producing the tyre.

At least one portion of component 3 is laid on the forming support 2, so as to form the tyre being processed 1 according to the previous definition.

According to a preferred embodiment, component 3 for example comprises one or more carcass plies of the tyre, or one or more belt strips of said tyre.

Component 3 of the tyre is at least partly formed with a plurality of semifinished elements 4 defining a radially external layer 5 of the tyre 1 being processed. Preferably, the semifinished elements 4 are strip-like elements of a cross-section size included between about 5 mm and about 50 mm, and thickness included between about 0.5 mm and about 3 mm.

The method according to the invention first of all comprises sending of a first radiation R1 to the tyre being processed 1. Preferably, this first radiation R1 sent is a laser radiation.

Advantageously the wavelength of this laser radiation can be included between about 460 nm and about 3100 nm and can be equal to about 650 nm, for example.

Then a first reflected radiation R1' is received which is exactly reflected from the radially external surface of the tyre being processed 1.

Note that the radially external surface of the tyre being processed 1 can consists both of the radially external layer 5 formed with said semifinished elements 4, if the first radiation sent R1 strikes on a point of the forming support on which at least one semifinished element has already been laid, and of the outer surface of the forming support 2, if the first radiation sent R1 strikes on a point of the forming support on which no semifinished element has been laid.

Depending on the first reflected radiation R1', one or more parameters P are determined which are representative of the thickness of the radially external layer 5 of the tyre being processed 1. Advantageously, the reflected radiation R1' is representative of a distance between the radially external surface of the tyre being processed 1 and a receiving point of the reflected radiation R1' itself.

Practically, being known a priori are all parameters related to the position of the emitter and receiver used, as well as the parameters related to the propagation speed of the first radiation sent R1 and the first reflected radiation R1', it is possible to determine the distance between the point of the radially external surface of the tyre being processed 1 at which the radiation is reflected and the point at which the reflected radiation R1' is received.

By performing this operation several times, as better clarified in the following, it is possible to determine the outer conformation of the tyre being processed 1.

After detecting the reflected radiation R1', it is preferably eliminated or at least reduced the effect of possible lack of homogeneity in the conformation of the forming support 2. The latter, in fact, can be obtained by approaching a plurality of substantially rectangular sectors (8 or 24 in number, for example) disposed around the same longitudinal axis, in parallel thereto. This structure clearly does not define an exactly cylindrical profile and can therefore cause inaccuracies in the calculation of parameters P.

In order to overcome this drawback, filtering on the reflected radiation R1' is advantageously carried out. In particular, first a division into harmonic components of the radiation itself is carried out (through FFT—Fast Fourier Transform, for example) and then at least the six first harmonic components are eliminated. Preferably the nine first harmonic components are eliminated, and in particular the twelve first harmonic components can be eliminated.

In addition or alternatively, for solving the same problem, detection of the outer conformation of the forming support 2 can be carried out, so that it is possible to directly take into account possible non-idealities of this outer conformation. Preferably, this detection is performed before starting deposition of the semifinished elements 4.

Advantageously, detection of the outer conformation of the forming support 2 can be carried out using the same devices as those for sending the first radiation R1, and receiving and processing the first reflected radiation R1'; these devices will be described in greater detail in the following.

Once the contribution due to the lack of homogeneity of the conformation of the forming support 2 has been eliminated (or reduced), said parameters P representative of the thickness of the radially external layer 5 of the tyre being processed 1 are determined.

Preferably, said one or more parameters P comprise at least one first parameter P1 representative of mutual overlap of said semifinished elements 4.

Diagrammatically, FIG. 3a shows two semifinished elements 4' and 4" in a condition of correct overlap. FIG. 3b, on the contrary, diagrammatically shows a condition of excessive overlap between the semifinished elements 4' and 4".

Preferably the first parameter P1 is determined as follows. First of all a plurality of values V1 is determined, which values are representative of a thickness of the radially external layer 5 of the tyre being processed 1. Then each of this values V1 is compared with a first threshold value TH1, and it is determined how many of these values V1 are greater than the first threshold value TH1. Practically, the first threshold value TH1 can represent a given thickness of the radially external layer 5 of the tyre being processed 1, corresponding to a thickness generated by overlapping, in the radial direction, of two semifinished elements.

The first parameter P1 can be calculated as the number N1 of consecutive values V1 higher than said first threshold value TH1. Preferably, said one or more parameters P comprise a second parameter P2, representative of a lack of mutual overlap between the semifinished elements 4.

FIG. 3c diagrammatically shows a condition of lack of overlap between two semifinished elements 4' and 4".

Preferably, the second parameter P2 is determined as follows. First a plurality of values V2 is determined, which values are representative of the thickness of the radially external layer 5 of the tyre being processed 1.

Note that values V2 can be determined irrespective of values V1 calculated with reference to the first parameter P1; alternatively, values V2 can consist of the previously calculated values V1 themselves. In other terms, in the second hypothesis, the same values V1 are used both for calculating the first parameter P1 and for calculating the second parameter P2.

These values V2 are then compared with a second threshold value TH2, and it is determined how many of these values V2 are smaller than the second threshold value TH2. Practically, the second threshold value TH2 can be representative of a minimum thickness of the radially external layer 5 of tyre 1 being processed, in which no semifinished element has been laid.

The second parameter P2 can then be calculated as the number N2 of consecutive values V2 smaller than the second threshold value TH2.

As above described, both for calculating the first parameter P1 and for calculating the second parameter P2 a plurality of values V1, V2 are determined which are representative of the thickness of the radially external layer 5 of the tyre 1 being processed.

These values are preferably determined by calculating the thickness of the radially external layer 5 in a plurality of circumferential positions CP of the tyre being processed 1.

It is to be pointed out that values V1, V2 can directly indicate the thickness of the radially external layer 5 of the tyre being processed 1, which thickness is calculated by difference, taking into account that the position and possibly also the conformation of the forming support 2 and the distance between the radially external surface of the tyre being processed 1 and the receiving point of the reflected radiation R1' are known a priori.

Values V1, V2 can at all events be representative of the thickness of the radially external layer 5 of the tyre being processed 1 even if they directly indicate the distance between the radially external surface of the tyre being processed 1 and the receiving point of the reflected radiation R1'. In fact, this distance is linked to the thickness of the radially external layer of the tyre being processed 1 by substantially constant parameters or in any case parameters known a priori.

Preferably, in calculating the first and/or second parameter P1, P2, the "consecutive" values V1, V2 are values of the thickness of the radially external layer 5 of the tyre being processed 1 that are determined at consecutive or adjacent circumferential positions CV, such as the circumferential positions CP1, CP2 and CP3 diagrammatically shown in FIGS. 2, 2*a*. Once said one or more parameters P have been calculated, they are compared with corresponding threshold values and, depending on the result of this comparison, an alarm signal S can be generated.

The alarm signal S can, for example, generate signalling of the acoustic and/or visual type aiming at drawing the operator's attention on the occurrence of problems during the tyre manufacture.

In addition or alternatively, the alarm signal S can cause interruption of the production process of the tyre being processed 1, so as to enable elimination of said tyre being processed 1 or settlement of the occurred problem.

More particularly, the alarm signal S can be generated if the first parameter P1 is greater than a first reference value REF1.

Preferably, the first reference value REF1 for the first parameter P1 is representative of a length equal to at least ⅓, and in particular at least ½ of the length of a semifinished element 4 measured along the circumferential extension of the forming support 2.

Preferably, the first reference value REF1 can indicate the maximum acceptable number of samples, i.e. the number of circumferential positions CP belonging to the same axial plane of the tyre being processed 1, in which values V1 are calculated which can be at most detected in an overlap region between two semifinished elements 4. By way of example, shown in FIG. 3*a* is the overlap region Z1 between the semifinished elements 4' and 4".

Practically, being the circumferential positions CP spaced apart the same distance from each other, the first parameter P1 is indicative of the circumferential extension of the overlap region between two semifinished elements 4, expressed as a measurement unit identifiable as the number of samples detected in said overlap region.

Correspondingly, the first reference value REF1 is indicative of the maximum circumferential extension of the overlap region, expressed in terms of maximum acceptable number of samples detected in the overlap region itself.

Numerically expressed, the first reference value REF1 will be equal to the number of samples that can be detected in an overlap region equal to at least ⅓, and in particular equal to at least ½, of the length of a semifinished element 4 measured along the circumferential extension of the forming support 2.

By selecting the first reference value REF1 in this way, it is possible to prevent situations in which disturbances, such as short unexpected peaks in the intensity of the detected radiation, may interfere in the carried out processing operations and alter the results thereof.

Just as an indication, the following numeric example can be considered, bearing in mind that the mentioned values are not necessarily confirmed by the practical implementation of the invention.

It is possible to imagine that along the circumferential direction of a single semifinished element 4 twelve detecting operations can be carried out (i.e. twelve values V1 can be determined), at respective twelve circumferential positions CP. In FIG. 2*a* only three circumferential positions CP1, CP2, CP3 are diagrammatically shown. The RF1 value, if it corresponds to ⅓ of the width of the semifinished element, will be equal to 4; otherwise, should RF1 value correspond to ½ of the width of the semifinished element, it would be equal to 6.

Suppose that REF1 is fixed to 6. Should more than six consecutive values V1 be higher than the respective threshold TH1 (i.e. should they be representative of the overlap between the semifinished element in question and the adjacent one), then the alarm signal S would be generated since the extension in the circumferential direction of the overlap region between the two semifinished elements would be excessive.

Vice versa, should the values V1 higher than TH1 be six or less than six, the alarm signal would not be generated.

For a better view of the two situations, reference can be made to FIGS. 3*b* and 3*a*; in FIG. 3*b* there are about nine or ten values V1 higher than TH1 (a situation in which the alarm signal S is generated), while in FIG. 3*a* there are about three or four values V1 higher than TH1 (a situation in which no alarm signal S is generated).

The alarm signal S can be also generated when the second parameter P2 is greater than a second reference value REF2.

Preferably, the second reference value REF2 for the second parameter P2 is representative of a length equal to at least ⅓ and in particular equal to at least ½, of the length of a semifinished element 4 measured along the circumferential extension of the forming support 2.

Preferably, the second reference value REF2 can indicate the maximum acceptable number of samples, i.e. the number of circumferential positions CP belonging to the same axial plane of the tyre being processed 1, wherein values V2 are calculated which can be at most detected in a region Z2 in which semifinished elements 4 have not been laid down. By way of example, shown in FIG. 3*c* is the "free" region Z2 between the semifinished elements 4' and 4". Practically, being the circumferential positions CP substantially spaced apart the same distance from each other, the second parameter P2 indicates the circumferential extension of the free region between two semifinished elements 4, expressed as a measurement unit identifiable as the number of samples detected in such a free region.

Correspondingly, the second reference value REF2 indicates the maximum circumferential extension of the free region expressed in terms of maximum acceptable number of samples detected in the free region itself.

Numerically expressed, the second reference value REF2 will be equal to the number of samples that can be detected in a free region equal to at least ⅓, and in particular equal to at least ½, of the length of a semifinished element 4 measured along the circumferential extension of the forming support 2.

By selecting the second reference value REF2 in this way it is possible to prevent situations in which disturbances, such as short unexpected peaks in the intensity of the detected radiation, may interfere in the carried out processing operations and alter the results thereof.

As above described, values V1, V2 are preferably determined by calculating the thickness of the radially external layer 5 of the tyre being processed 1 in a plurality of circumferential positions CP of said tyre being processed 1.

Preferably, at least part of the circumferential positions CP belong to an axial mid-line plane X1 of the forming support (FIGS. 1 and 2).

Preferably, the first radiation sent R1 comprises at least one main radiation beam F1 directed, in time succession, onto the aforesaid circumferential positions CP of the tyre being processed 1.

The first reflected radiation R1' preferably will comprise at least one corresponding beam F1'. In a preferred embodiment, part of the circumferential positions CP belong to a pair of auxiliary planes X2, X3 that are substantially parallel to the aforesaid axial mid-line plane X1. In particular, each auxiliary plane X2, X3 is included between the axial mid-line plane X1 and a respective axial end 2a, 2b of the forming support 2.

Preferably, the auxiliary planes X2, X3 are at substantially symmetric positions relative to the axial mid-line plane X1.

Advantageously, the first radiation sent R1 further comprises a pair of auxiliary radiation beams F2, F3 directed, in time succession, onto the positions belonging to said auxiliary planes X2, X3.

Therefore the first reflected radiation R1' will comprise corresponding auxiliary beams F2', F3', diagrammatically shown in FIG. 2.

In a preferred embodiment, in addition to the first radiation sent R1, a second radiation R2 is emitted towards the tyre being processed 1 (FIG. 5).

In particular, for each circumferential position CP onto which the first radiation R1 is sent, the second radiation R2 is sent, in a circumferentially spaced apart position relative to the position CP onto which the first radiation R1 is sent.

Then a corresponding second reflected radiation R2' is received, the latter being reflected from the radially external surface of the tyre being processed 1. In this way, the parameters P can be also determined as a function of the second reflected radiation R2'.

In greater detail, the second radiation R2 and the second reflected radiation R2' can have a structure similar to the first radiation R1 and the first reflected radiation R1', respectively.

The second radiation R2 may comprise at least one main beam B1, directed to circumferential positions CP' (of the tyre being processed 1) belonging to the axial mid-line plane X1; the second reflected radiation R2' will comprise a corresponding beam B1'. Advantageously, beams B1, B1' can lie in the axial mid-line plane X1.

The second radiation R2 may further comprise a pair of auxiliary beams B2, B3, directed onto circumferential positions belonging to said auxiliary planes X2, X3; the second reflected radiation R2' therefore will comprise corresponding beams B2', B3'. Advantageously, beams B2, B2' belong to the plane X2, and beams B3, B3' belong to the plane X3.

In a preferred embodiment, after detecting parameters representative of the radial thickness of the radially external layer 5 of the tyre being processed 1, performance of a step of calculating statistical (such as average and variance) parameters is provided, which parameters can be taken into account for determining generation of the alarm signal S.

In particular, the alarm signal S can be generated when, in the light of the calculated average and variance, the parameters representative of the tyre being processed 1 are too far from preset design data.

In a preferred embodiment, the alarm signal S can also incorporate data identifying the angular position at which the anomaly (excessive overlap or excessive distance between the semifinished elements) has been detected which has caused generation of the alarm signal S itself. These data may for instance comprise either parameters identifying the angular position in which an excessive number of positive peaks has been detected in the reflected radiation (too many values V1 higher than TH1), or parameters identifying the angular position in which an excessive number of negative peaks (too many values V2 smaller than TH2) has been detected.

As mentioned above, the present invention also refers to an apparatus for controlling the deposition of semifinished elements for tyre production.

Figure 4:
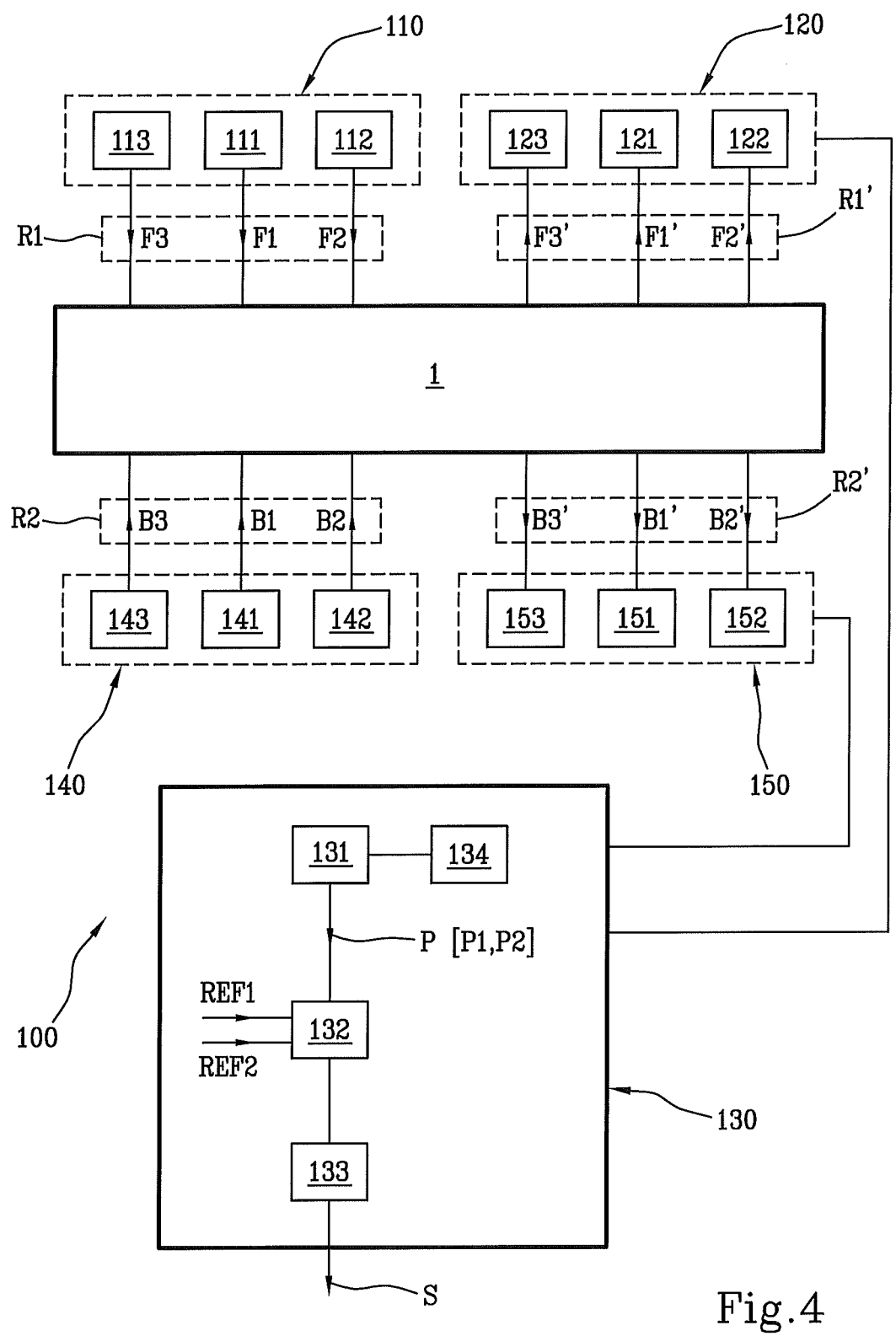
FIG. 4 is a block diagram representing an apparatus according to the present invention.

This apparatus, denoted at 100, is diagrammatically shown in FIG. 1 and, through a block diagram, in FIG. 4.

Apparatus 100 first of all comprises a first emitting structure 110 for sending the first radiation R1 to the tyre being processed 1. Preferably, the first emitting structure 110 comprises at least one main emitter 111 positioned on said axial mid-line plane X1.

The main emitter 111 advantageously generates the main radiation beam F1, directed onto the circumferential positions CP lying in the axial mid-line plane X1. Practically, the main emitter 111 can be substantially positioned in the axial mid-line plane X1 so as to suitably direct beam F1. The latter advantageously will lie in the axial mid-line plane X1.

In a preferred embodiment, the first emitting structure 110 further comprises a pair of auxiliary emitters 112, 113, positioned each on a respective one of said auxiliary planes X2, X3. Advantageously, the auxiliary emitters 112, 113 generate the auxiliary beams F2', F3', respectively.

Apparatus 100 further comprises a first receiving structure 120 for reception of the first reflected radiation R1'. Preferably, the first receiving structure 120 comprises at least one main sensor 121; in particular, the main sensor 121 can be positioned in the axial mid-line plane X1, for receiving the radiation beam F1'. Advantageously, beam F1' will lie in the axial mid-line plane X1.

In a preferred embodiment, the first receiving structure 120 further comprises a pair of auxiliary sensors 122, 123, positioned each in a respective one of said auxiliary planes X2, X3. In this way, the auxiliary sensors 122, 123 can receive the auxiliary beams F2, F3, respectively.

Apparatus 100 further comprises a processing unit 130 that, depending on the received radiation, carries out generation of said alarm signal S. In particular, the processing unit 130 comprises an operating module 131 configured for determining said parameters P, as a function of the reflected radiation. In particular, the operating module 131 can be provided for calculating the first parameter P1 and/or the second parameter P2.

For determining the first parameter P1, the operating module 131 determines values V1 as a function of the reflected radiation R1', and compares these values V1 with the first threshold value TH1, so as to determine how many of values V1 are higher than TH1 and therefore define the first parameter P1.

A comparison module 132 then compares the first parameter P1 with the first reference value REF1. When the first parameter P1 is greater than the first reference value REF1, a transmission module 133 is activated which generates said alarm signal S.

In the light of the above, the transmission module 133 can generate the alarm signal S when between two semifinished elements 4 a condition of excessive overlap (first parameter P2 greater than the first reference value REF1) occurs.

Advantageously, the operating module 131 can be also configured for determining the second parameter P2. To this aim, the operating module 131 calculates a plurality of values V2 representative of the thickness of the radially external layer 5 of the tyre being processed 1.

As above described, values V2 can be identical with the already calculated values V1, or they can be determined in an independent manner starting at least from the reflected radiation R1.

The operating module 133 compares values V2 with the second threshold value TH2, and how many of these values V2 are smaller than the second threshold value TH2 is determined. In this way the second parameter P2 is determined.

The comparison module 132 then compares the second parameter P2 with the second reference value REF2. When the second parameter P2 is greater than the second reference value REF2, the transmission module 133 is activated and said alarm signal S is generated.

In the light of the above, the transmission module 133 can generate the alarm signal. S when between two semifinished elements 4 an excessive mutual spacing occurs (second parameter P2 greater than the second reference value REF2).

Advantageously, the operating module 131 is configured for determining values V1, V2 through determination of the thickness of the radially external layer 5 of the tyre being processed 1 on the above mentioned circumferential positions CP of said tyre being processed 1.

In the preferred embodiment, the processing unit 130 further comprises a filtering module 134 for filtering the first reflected radiation R1' in such a manner as to eliminate at least the six first harmonic components of said first reflected radiation R1'.

In particular, the filtering module 134 can eliminate the nine first harmonic components of the first reflected radiation R1', and more particularly can eliminate the twelve first harmonic components of the first reflected radiation R1'.

As above described, this filtering operation enables the non-ideality contribution due to the conformation of the forming support 2 to be eliminated or at least reduced.

In addition or as an alternative to the filtering operation, the operating module 131 is configured for determining parameters V1, V2 also as a function of a conformation of the forming support 2.

To this aim, the operating module 131 can be configured for, in cooperation with the first emitting structure 110 and the first receiving structure 120, detecting the outer conformation of the forming support 2, before deposition of the semifinished elements 4. In this way, in determining values V1, V2, the conformation of the forming support 2 can be directly taken into account and values V1, V2 can be reliably representative of the thickness (in the radial direction) of the radially external layer 5 of the tyre being processed 1.

In a preferred embodiment, the operating module 131 is configured for determining parameters P also as a function of a second radiation R2' reflected from the radially external surface of the tyre being processed 1.

The second reflected radiation R2' is obtained from a second radiation R2 sent onto the tyre being processed 1, in a circumferential position spaced apart from the position onto which the first radiation R1 is sent. This operation is advantageously performed for each circumferential position CP onto which the first radiation R1 is sent.

To this aim, apparatus 100 comprises a second emitting structure 140 for sending at least the second radiation R2 onto the tyre being processed 1, and a second receiving structure 150 for receiving at least the second reflected radiation R2'.

Practically, as diagrammatically shown in FIG. 5, while the first emitting structure 110 is sending the first radiation R1 onto the circumferential position CP, through the second emitting structure 140 the second radiation R2 can be sent to the circumferential position CP'. In this way, the processing unit 130 will be able to determine, as a function of the first reflected radiation R1' and the second reflected radiation R2', the outer conformation of the tyre being processed 1.

Advantageously, the second emitting structure 140 may comprise a main emitter 141, preferably positioned at the axial mid-line plane X1. The main emitter 141 can generate a main beam B1 belonging to the second radiation R2. Preferably, the main beam B1 is directed onto a circumferential position CP' of the tyre being processed 1 lying in the axial mid-line plane X1.

Correspondingly, the second receiving structure 150 may comprise a main sensor 151, preferably positioned at the axial mid-line plane X1. The main sensor 151 is provided for receiving the second reflected radiation R2', and in particular a radiation beam B1' generated by reflection of beam B1 on the radially external surface of the tyre being processed 1.

Preferably, the second emitting structure 140 further comprises a pair of auxiliary emitters 142, 143, adapted to generate respective radiation beams B2, B3 belonging to the second radiation R2.

The radiation beams B2, B3 strike on circumferential positions CP' of the radially external surface of the tyre being processed 1 which lie on said auxiliary planes X2, X3.

Correspondingly, the second receiving structure 150 may comprise a pair of auxiliary sensors 152, 153 adapted to receive the radiation beams B2', B3' generated by reflection of beams B2, B3 on the radially external surface of the tyre being processed 1.

The processing unit 130, also as a function of the reflected radiation R2' received from the second receiving structure 150, can calculate the parameters P, and in particular the values V1, V2 used for determining the first and second parameters P1, P2.

As diagrammatically shown in FIG. 1, apparatus 100 can be advantageously used in a work station 200 for deposition of semifinished elements for tyre production.

The work station 200 (FIG. 6) comprises the forming support 2 and one or more members 190 for laying the semifinished elements 4 on the forming support 2, so as to form said tyre being processed 1.

Within this scope, apparatus 100 is used for control of the deposition of the semifinished elements 4, in particular for detecting possible excessive overlaps and/or possible excessive spacing apart between adjacent semifinished elements.

In an embodiment, sending of the radiation (or radiation beams) to the tyre being processed 1, receiving of the corresponding reflected radiation and processing of the latter for control of the deposition, can be performed during deposition of the semifinished elements 4, thus carrying out a control technique substantially in real time.

In a different embodiment, sending of the radiation to the tyre being processed 1, receiving of the corresponding reflected radiation and processing of the latter for deposition control can be performed at the end of the deposition of the semifinished elements 4, before the tyre being processed 1 is submitted to subsequent operations of the building process.

It should be noted that during manufacture of the tyre, the forming support 2 can be rotated around a longitudinal rotation axis A of its own. This movement can be also advantageously used during performance of the operations for emitting and receiving the radiations R1, R1', R2, R2' employed for determination of parameters P and the possible subsequent generation of the alarm signal S. Practically, being the emitting structures 110, 140 and receiving structures 120, 150 substantially stationary (i.e. substantially integral with the ground), sending of radiation beams onto different circumferential positions of the tyre being processed 1 is advantageously obtained by virtue of said rotation of the tyre being processed 1 around the longitudinal rotation axis A.

The invention claimed is:

1. A method of controlling the deposition of a plurality of semifinished elements for tyre production, comprising:
    sending a first radiation onto at least one component of a tyre being processed, said component being at least partly formed with said plurality of semifinished elements defining a radially external layer of said tyre being processed, said semifinished elements being strip-like elements distinct from each other and suitably disposed in side-by-side or partially overlapped relationship, said strip-like elements being laid axially on a forming support;
    receiving a corresponding first reflected radiation from a radially external surface of said tyre being processed;
    determining, as a function of at least said first reflected radiation, one or more parameters representative of a thickness of said radially external layer;
    wherein said one or more parameters comprise a first parameter representative of mutual overlapping of said semifinished elements and a second parameter representative of a lack of mutual overlapping of said semifinished elements,
    wherein determining said one or more parameters comprises:
        determining a plurality of values representative of the thickness of the radially external layer in a plurality of circumferential positions of said tyre being processed,
        comparing said values with a first threshold value and with a second threshold vale, wherein the first threshold value represents an overlapping, in the radial direction, of two semifinished elements, and the second threshold value represents a case where no semifinished element has been laid,
        determining how many of said values are higher than said first threshold value and how an of said values are lower than said second threshold value,
        calculating the first parameter as the number of consecutive values higher than said first threshold value, and
        calculating the second parameter as the number of consecutive values smaller than the second threshold value;
    comparing said one or more parameters with corresponding reference values; and
    generating an alarm signal as a function of said comparison,
    wherein the alarm signal is generated if the first parameter is greater than a first reference value or if the second parameter is greater than a second reference value,
    each of the first reference value and the second reference value being representative of a distance equal to at least 1/3 of a width of one of said semifinished elements measured along a circumferential extension of said forming support.

2. The method as claimed in claim 1, wherein said first reflected radiation is representative of a distance between the radially external surface of the tyre being processed and a receiving point of said reflected radiation.

3. The method as claimed in claim 1, wherein the first reference value for said first parameter is representative of a distance equal to at least 1/2 of the width of the one semifinished element measured along the circumferential extension of said forming support.

4. The method as claimed in claim 1, wherein the second reference value for said second parameter is representative of a distance equal to at least 1/2 of the width of the one semifinished element measured along the circumferential extension of said forming support.

5. The method as claimed in claim 1, wherein at least part of said circumferential positions belong to an axial mid-line plane of said forming support.

6. The method as claimed in claim 5, wherein part of said circumferential positions belong to a pair of auxiliary planes substantially parallel to said axial mid-line plane, each of said auxiliary planes being interposed between said axial mid-line plane and a respective axial end of said forming support.

7. The method as claimed in claim 6, wherein said auxiliary planes are at substantially symmetric positions relative to said axial mid-line plane.

8. The method as claimed in claim 7, wherein the first radiation further comprises a pair of auxiliary radiation beams directed, in time succession, onto positions belonging to said auxiliary planes.

9. The method as claimed in claim 1, wherein said first radiation comprises at least one radiation beam directed, in time succession, onto said circumferential positions of said tyre being processed.

10. The method as claimed in claim 1, comprising filtering of said first reflected radiation in such a manner as to eliminate at least six first harmonic components of said first reflected radiation.

11. The method as claimed in claim 1, comprising detection of an outer conformation of said forming support, said one or more parameters representative of the thickness of said radially external layer being also determined as a function of conformation of said forming support.

12. The method as claimed in claim 11, wherein detection of said outer conformation is performed before deposition of said semifinished elements.

13. The method as claimed in claim 1, further comprising, for each circumferential position onto which said first radiation is sent:
    sending a second radiation onto said tyre being processed at a circumferentially spaced apart position relative to a position onto which said first radiation is sent; and
    receiving a corresponding second reflected radiation from the radially external surface of said tyre being processed, said one or more parameters being also determined as a function of said second reflected radiation.

14. The method as claimed in claim 1, wherein sending said radiation and receiving said reflected radiation are performed during deposition of said semifinished elements.

15. The method as claimed in claim 1, wherein said component of the tyre being processed comprises one or more carcass plies of said tyre.

16. The method as claimed in claim 1, wherein said component of the tyre being processed comprises one or more belt strips.

17. The method as claimed in claim 1, wherein said width of one of said semifinished elements measured along a circumferential extension of said forming support is between about 5 mm and about 50 mm.

18. An apparatus for controlling the deposition of a plurality of semifinished elements for tyre production, comprising:
    a first emitting structure for sending a first radiation onto at least one component of a tyre being processed, said component being at least partly formed with said plurality of semifinished elements defining a radially external layer of said tyre being processed, said semifinished elements being strip-like elements distinct from each other and suitably disposed in side-by-side or partially overlapped relationship, said strip-like elements being laid axially on a forming support;

a first receiving structure for receiving a corresponding first reflected radiation from a radially external surface of said tyre being processed; and a processing unit provided with:
- an operating module configured for determining, as a function of at least said first reflected radiation, one or more parameters representative of a thickness of said radially external layer,
- wherein said one or more parameters comprise a first parameter representative of a mutual overlapping of said semifinished elements and a second parameter representative of a lack of mutual overlapping of said semifinished elements, and
- wherein determining said one or more parameters comprises:
  - determining a plurality of values representative of the thickness of said radially external layer in a plurality of circumferential positions of said tyre being processed,
  - comparing said values with a first threshold value and with a second threshold value, wherein the first threshold value represents an overlapping, in the radial direction, of two semifinished elements, and the second threshold value represents a case where no semifinished element has been laid,
  - determining how many of said values are higher than said first threshold value and how many of said values are lower than said second threshold value,
  - calculating the first parameter as the number of consecutive values higher than said first threshold value, and
  - calculating the second parameter as the number of consecutive values smaller than the second threshold value;

the processing unit being further provided with:
- a comparison module configured for comparing said one or more parameters with corresponding reference values; and
- a transmission module configured for generating an alarm signal as a function of said comparison,
- wherein the alarm signal is generated if the first parameter is greater than a first reference value or if the second parameter is greater than a second reference value,
- each of the first reference value and the second reference value being representative of a distance equal to at least ⅓ of a width of one of said semifinished elements measured along a circumferential extension of said forming support.

19. The apparatus as claimed in claim 18, wherein at least part of said circumferential positions belong to an axial mid-line plane of said forming support.

20. The apparatus as claimed in claim 19, wherein said first emitting structure comprises at least one main emitter positioned in said axial mid-line plane, and said first receiving structure comprises at least one main sensor positioned in said axial mid-line plane.

21. The apparatus as claimed in claim 20, wherein said first emitting structure comprises a pair of auxiliary emitters, each auxiliary emitter being positioned in a respective auxiliary plane.

22. The apparatus as claimed in claim 18, wherein said first receiving structure comprises a pair of auxiliary sensors, each auxiliary sensor being positioned in a respective auxiliary plane.

23. The apparatus as claimed in claim 18, wherein said processing unit comprises a filtering module for filtering said first reflected radiation in such a manner as to eliminate at least six first harmonic components of said first reflected radiation.

24. The apparatus as claimed in claim 18, wherein said operating module is configured for determining said one or more parameters representative of the thickness of said radially external layer also as a function of a conformation of said forming support.

25. The apparatus as claimed in claim 24, wherein said operating module is configured, in co-operation with said first emitting structure and said first receiving structure, for detecting an outer conformation of the forming support.

26. The apparatus as claimed in claim 18, wherein said operating module is configured for determining said one or more parameters also as a function of a second reflected radiation from the radially external surface of said tyre being processed, obtained from a second radiation sent onto said tyre being processed, at a circumferentially spaced apart position relative to a position onto which said first radiation is sent, for each circumferential position onto which said first radiation is sent.

27. The apparatus as claimed in claim 26, further comprising:
- a second emitting structure for sending at least said second radiation onto said tyre being processed; and
- a second receiving structure for receiving at least said second reflected radiation from the radially external surface of said tyre being processed.

28. The apparatus as claimed in claim 18, wherein said width of one of said semifinished elements measured along a circumferential extension of said forming support is between about 5 mm and about 50 mm.

* * * * *

UNITED STATES PATENT AND TRADEMARK OFFICE
CERTIFICATE OF CORRECTION

PATENT NO. : 9,207,656 B2
APPLICATION NO. : 13/807611
DATED : December 8, 2015
INVENTOR(S) : Michele Ballabio et al.

It is certified that error appears in the above-identified patent and that said Letters Patent is hereby corrected as shown below:

In the Claims

Claim 1, Col. 15, Line 43, "an of" should read --many of--.

Signed and Sealed this
Sixteenth Day of August, 2016

Michelle K. Lee
*Director of the United States Patent and Trademark Office*